Figure 4:
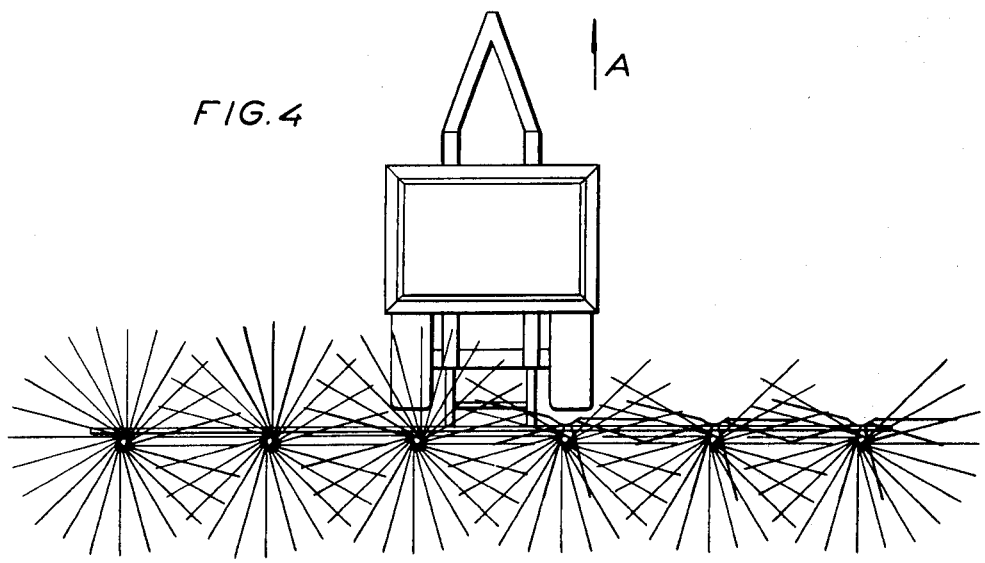

United States Patent [19]

Harderup

[11] 4,081,142
[45] Mar. 28, 1978

[54] PROTECTIVE AND LEVELLING DEVICE FOR DISTRIBUTOR MACHINES

[76] Inventor: Ernst Einar Harderup, Lilla Vastergatan 4a S-271 00, Ystad, Sweden

[21] Appl. No.: 734,753

[22] Filed: Oct. 22, 1976

[30] Foreign Application Priority Data

Oct. 28, 1975  Sweden ............................... 7512025

[51] Int. Cl.² .............................................. A01C 17/00
[52] U.S. Cl. ...................................... 239/687; 239/666
[58] Field of Search ............... 239/523, 650, 653, 661, 239/667, 672, 681–687

[56] References Cited

U.S. PATENT DOCUMENTS

| | | | |
|---|---|---|---|
| 834,839 | 10/1906 | Mitchell | 239/686 X |
| 2,594,084 | 4/1952 | Skibbe et al. | 239/661 |
| 2,600,167 | 6/1952 | Jones | 239/661 |
| 3,469,718 | 9/1969 | Felix et al. | 239/666 X |

FOREIGN PATENT DOCUMENTS 848,429  7/1949  Germany ............................ 239/665

*Primary Examiner*—John J. Love

[57] ABSTRACT

The disclosure relates to a protective and levelling device for use in a distributor which is primarily intended for commercial fertilizer, the distributor having a spreader device which rotates in a horizontal plane and ejects the material to be distributed radially or tangentially in this plane. The protective and levelling device comprises a deflector plate which is located in the path of the flow of material originating from the spreader device, between the spreader device and the distributor machine proper. Moreover, in its capacity as impingement surface for the flow of material, the deflector plate has a convex curved surface, whereby that portion of the flow of material which impinges on the convex surface will rebound from the surface and be distributed.

1 Claim, 7 Drawing Figures

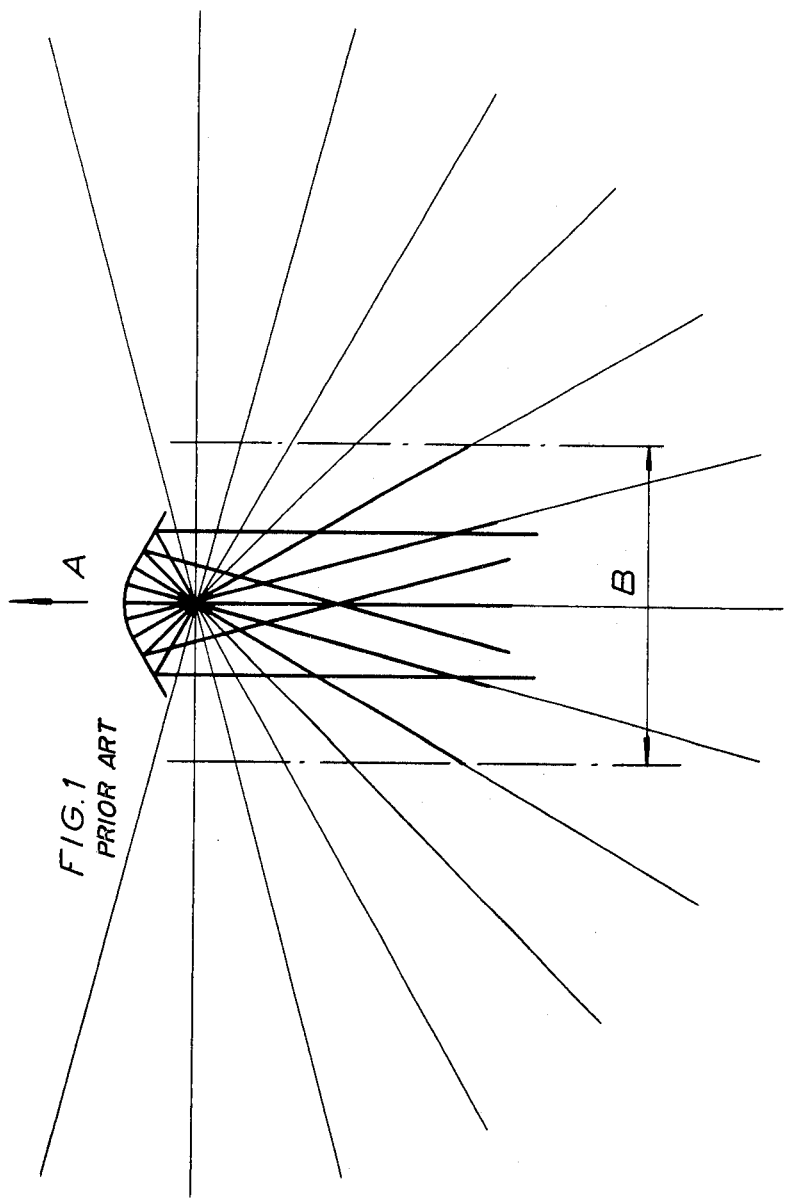

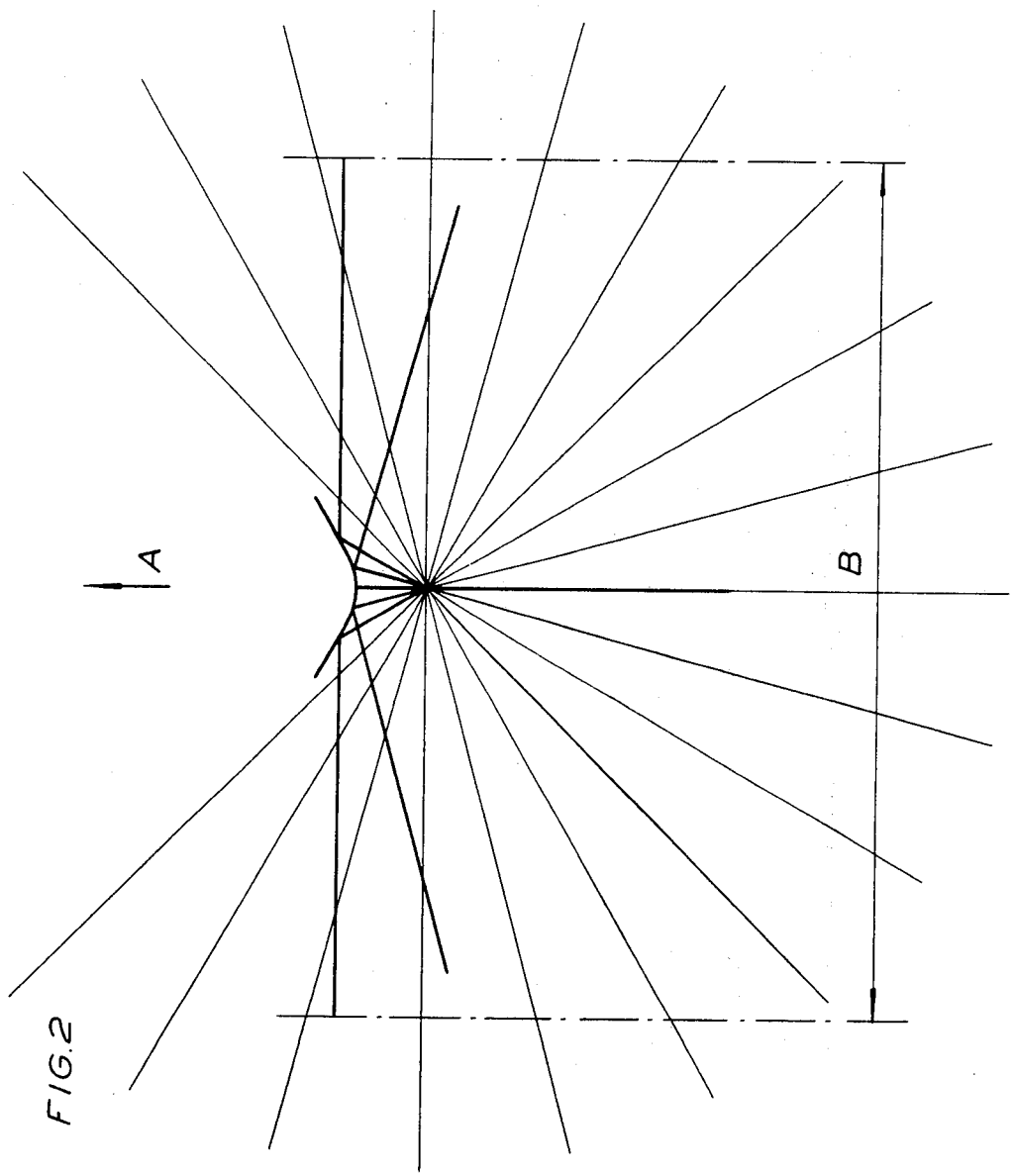

PROTECTIVE AND LEVELLING DEVICE FOR DISTRIBUTOR MACHINES

The present invention relates to a protective and levelling device which is particularly designed for use in commercial fertilizer distributors for protecting the distributor machine proper and for levelling out the distribution pattern. However, the device is also well suited for use in conjunction with distributors which are used for spreading granular material, for example, distributor machines for road salt or gravel.

In commercial fertilizer distributors, use is often made of rotary spreaders which throw out the fertilizer in a horizontal plane and in a radial or tangential direction. Such commercial fertilizer distributors can either be provided with a single large spreader device or with several smaller such devices which, in such an event, are disposed in spaced apart relationship along an arm mounted transversely of the direction of travel of the fertilizer distributor. Because of the construction of the spreader device, the fertilizer will be thrown out in all directions about the spreader device, that is to say, not only to the back and sides but also forwards, for which reason the fertilizer distributor will itself be hit by fertilizer thrown out forwardly. As a result, the distribution pattern will be disturbed by the distributor itself which will then be greatly soiled by the fertilizer. In order to protect the fertilizer distributor proper from the fertilizer which is thrown out forwardly, use is normally made of sheet metal guards which partially enclose the rotary spreader device. Even if such a sheet metal guard protects the machine and keeps it clean it has a highly unfavourable effect on the distribution pattern, since the fertilizer which hits the guard will rebound and be focused downwardly because of the concave shape of the guard. As a result, the distribution density will be considerably greater directly beneath and immediately to the sides of the guard than within the remainder of the distribution area.

The object of the present invention is to realize a protective and levelling device of the type indicated by way of introduction, which device protects machine parts located ahead of the spreader device or devices without spoiling the fertilizer distribution pattern.

According to the invention, the protective and levelling device is in the form of a deflector plate disposed in the ejection plane of the material flow and at right angles thereto, the plate being arched in a convex fashion throughout its entire width so as to constitute a convex, spreader impingement surface for the entire flow of material which impinges on it.

Practical tests have shown that this design of the device according to the present invention gives highly favourable results. Thus, thanks to the use of a protective and levelling device according to the present invention, it is possible to reduce the variation coefficient of distribution to half of the value which occurs in the use of conventional sheet metal guards which partially enclose the spreader device.

Figure 3:
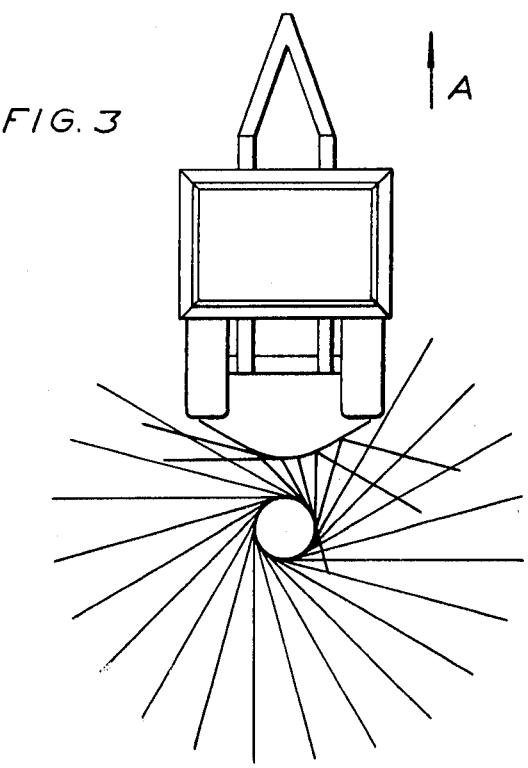
Figure 5:
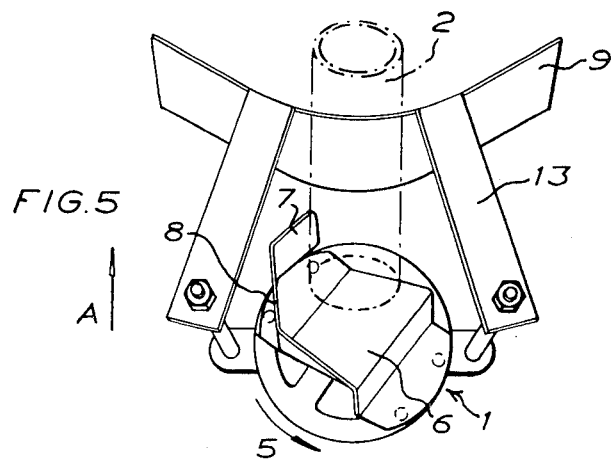
Figure 6:
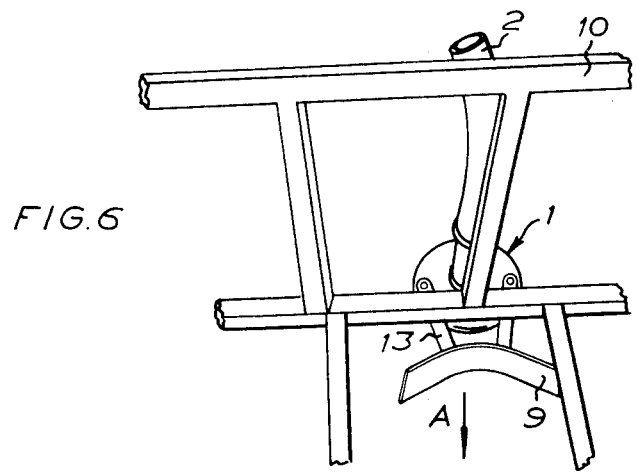
Figure 7:
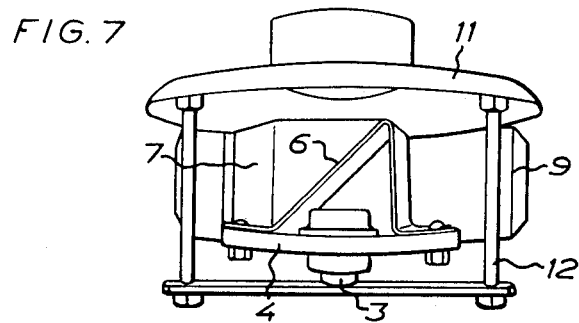

The present invention and its aspects will be more readily understood from the following description of the drawings, and discussion relating thereto. In the accompanying drawings, FIG. 1 schematically illustrates the focusing effect of a conventional sheet metal guard;

FIG. 2 schematically illustrates the distribution levelling effect achieved by the device according to the present invention;

FIG. 3 is a schematic top plan view of the distribution-levelling effect which the device according to the present invention has on a fertilizer distributor with a single rotary spreader device;

FIG. 4 illustrates schematically, in the left-hand half of the figure, the distribution pattern of a rotary spreader device without a protective and levelling device, whereas the righthand half of the figure illustrates the distribution pattern as obtained with the device according to the present invention; and FIGS. 5 – 7 show in perspective a normal rotary spreader device which is provided with the protective and levelling device according to the present invention.

FIG. 1 shows the distribution pattern from a rotary spreader device which can be a freely-running or positively-driven rotary, winged disk, the fertilizer being fed out onto the centre of the disk. The fertilizer will then, because of the effect of the centrifugal force, be ejected in a horizontal plane in a tangential or radial direction. If a sheet metal guard of conventional design is used, that is to say, a guard disposed more or less concentrically about the spreader device, the guard will have a powerfully focusing effect on the fertilizer which impinges on it. The result will be that all of the fertilizer which, without the influence of the sheet metal guard would have been spread across the leading half of the distribution area, will now hit the sheet metal guard and be concentrated to a narrow region which is of the insignificant width indicated by the arrows B.

FIG. 2 shows the effect of the protective and levelling device according to the invention upon the distribution pattern. As is apparent from this figure, a convex deflector disposed closely adjacent the rotary spreader device will broadcast that fertilizer which, without the influence of the deflector would have been spread over the leading half of the distribution area, over an area indicated by the arrows B. It will be appreciated from this figure that the distribution area of the fertilizer rebounding from the deflector will coincide substantially with the trailing half (the arrow A indicates the direction of travel of the distributor machine) of the distribution area achieved without the use of the deflector. As a result, if the deflector according to the present invention is used, the distribution pattern will be on the whole the same as if the distribution had been effected completely unhindered.

It will be apparent from FIG. 3 that the deflector according to the present invention intercepts the forwardly directed (arrow A) flow of material from the rotary spreader device so that this flow does not impinge upon the fertilizer distributor machine proper but instead rebounds and is evenly distributed back over the entire distribution width.

A part of FIG. 4 (the left-hand side of the figure) schematically illustrates the distribution pattern from rotary spreader devices which are not provided with any form of deflector. It is clearly apparent that the spreader devices at the centre of the distributor machine eject a great portion of the fertilizer in a direction such that the fertilizer impinges upon the distributor machine itself. The right-hand half of the figure shows how the distribution pattern appears if each spreader device is provided with a deflector according to the present invention. In such an event, no fertilizer will be ejected in a forward direction (arrow A) and consequently no fertilizer will impinge upon the fertilizer distributor, all of the ejected material being instead evenly broadcast to the sides and rear.

FIGS. 5 – 7 illustrate a suitable design of the protective and levelling device according to the invention together with a rotary spreader device of the type disclosed in Swedish Patent Specification No. 325 164. As is particularly clearly apparent from FIGS. 5 and 7, the spreader device has a circular disk 4 which is fixedly mounted on a shaft 3, the shaft being freely journaled in bearing means (not shown). A fertilizer supply hose 2 is disposed centrally above the spreader device 1. A powerful air current is discharged through the hose and carries the fertilizer. The illustrated spreader device is disposed for rotation in a horizontal plane in the direction of the arrow 5 and, consequently, the discharge nozzle of the supply hose is vertically directed. As is apparent from FIG. 5 and 7, the spreader device has an inclined surface 6 which slopes steeply in relation to the material discharge direction from the hose 2, whereby the material flow will be deflected so as to run on the spreader device radially outwardly and in a downward direction along the sloping surface. A vertical vane 7 is disposed at the periphery of the disk 4, the radial inner portion 8 of the vane making an angle with a radius of the disk 4. As a result, the flow of material, on striking the inner portions 8, will make the disk 4 rotate in the direction of the arrow 5. At the same time, the flow of material will slide along the inner portions of the vane 7 and be discharged from the spreader device at the outer free end of the vane 7. The spreader device will, as a result, eject the fertilizer in a generally tangential direction in the horizontal plane in which the disk 4 rotates.

A bracket 11 for the material supply hose is provided, suitably immediately above the spreader device. As is also suggested in FIG. 7, this bracket 11 supports, by the intermediary of bolts 12, bearing means for the shaft 3 of the disk 4. As can be read from FIG. 6, the deflector plate 9 itself can suitably be secured to the bracket 11 by means of support arms 13. Here, it is advisable that the support arms 13 are of adjustable effective length, whereby the interception area of the deflector plate for fertilizer thrown out forwardly can be changed. Alternatively, the deflector plate 9 can be secured directly in the frame 10, intimated in FIG. 6, for the fertilizer distributor.

As is apparent from the drawings, the deflector plate is convex in a direction towards the spreader device. The deflector plate can be curved in many different ways, for example, along a circular arc, a parallel arc or any other given curve. The deflector plate shown in FIG. 5 is not fully symmetrical, the half on one side of the top being slightly longer than the other. This is advisable in view of the fact that the ejection direction from the spreader device is generally tangential. If, on the other hand, the spreader device is designed for substantially radial ejection, the deflector plate should be symmetrical.

The above-described deflector plate is designed primarily for cooperation with the illustrated type of spreader device on a commercial fertilizer distributor but can, naturally, also be used to great advantage with rotary or fixed spreader devices of different designs, for example, of the type used on spreading machines for sand or road salt. As a rule, such spreader devices are positively-driven and, consequently, lack both the inclined surface 6 and the obliquely directed vane 7, having only a number of radially directed scoops.

The protective and levelling device according to the invention has, in the illustrated embodiment, a deflector 9 of bare sheet metal. However, in certain cases, for example, if the material to be distributed is of an abrasive nature, it can be advisable to use a protective coating of elastic material such as rubber for increasing the working-life of the deflector plate. Furthermore, such a coating could also be used to provide the deflector with particular rebound properties which can easily be varied across the width of the deflector, whereby the distribution pattern can be varied.

What I claim and desire to secure by Letters Patent is:

1. In combination with a rotary spreader device for distributing a flow of granular material in a radial or tangential direction, a deflector plate disposed in the ejection plane of the flow of material and at right angles thereto producing partial interception of said flow the improvement comprising the deflector plate being in a single curvature convex configuration to provide a convex distribution impingment surface for the entire flow of material which impinges thereupon.

* * * * *